(12) United States Patent
Schwager et al.

(10) Patent No.: US 11,594,805 B2
(45) Date of Patent: Feb. 28, 2023

(54) ANTENNA INTEGRATION IN A PORTABLE INFORMATION HANDLING SYSTEM

(71) Applicant: Dell Products L.P., Round Rock, TX (US)

(72) Inventors: Mark Andrew Schwager, Cedar Park, TX (US); Sumana Pallampati, Austin, TX (US); Kai-Yuan Cheng, Taipei (TW); Nicholas G. DiLoreto, Georgetown, TX (US); Zhong-Chao Lee, Tainan (TW); Changsoo Kim, Cedar Park, TX (US); Ching Cheng Hsu, Taipei (TW); Yu-Feng Huang, Hsin-Chu (TW)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 17/081,408

(22) Filed: Oct. 27, 2020

(65) Prior Publication Data

US 2022/0131255 A1   Apr. 28, 2022

(51) Int. Cl.
*H01Q 1/22* (2006.01)
*H01Q 1/48* (2006.01)
*H01Q 13/10* (2006.01)
*G06F 3/023* (2006.01)

(52) U.S. Cl.
CPC ......... *H01Q 1/2266* (2013.01); *G06F 3/0231* (2013.01); *H01Q 1/48* (2013.01); *H01Q 13/10* (2013.01)

(58) Field of Classification Search
CPC ......... H01Q 1/2266; H01Q 13/10-106; H01Q 1/243
See application file for complete search history.

(56) References Cited

U.S. PATENT DOCUMENTS

| | | | |
|---|---|---|---|
| 2019/0027808 A1* | 1/2019 | Mow | H04R 5/04 |
| 2019/0237848 A1* | 8/2019 | Ramasamy | G06F 1/1683 |
| 2020/0127384 A1* | 4/2020 | Thakur | G06F 1/1698 |
| 2020/0243947 A1* | 7/2020 | Yamamoto | H01Q 1/526 |
| 2021/0126345 A1* | 4/2021 | Yoo | H01Q 1/38 |

* cited by examiner

*Primary Examiner* — Ricardo I Magallanes
(74) *Attorney, Agent, or Firm* — Terrile, Cannatti & Chambers; Stephen A. Terrile (57) ABSTRACT

An antenna assembly for a portable information handling system. The antenna assembly includes an antenna bounding component, the antenna bounding component being electrically and physically connected to a top cover portion of the portable information handling system; and, an antenna, the antenna being mounted to the antenna bounding portion, radio frequency (RF) radiation radiating via an RF radiation path, the RF radiation path being provided by a radiation slot, the radiation slot being located within a bottom cover portion of the portable information handling system.

8 Claims, 12 Drawing Sheets

ANTENNA INTEGRATION IN A PORTABLE INFORMATION HANDLING SYSTEM

BACKGROUND OF THE INVENTION

Field of the Invention

The present invention relates to information handling systems. More specifically, embodiments of the invention relate to an antenna for a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to an antenna assembly for a portable information handling system, comprising: an antenna bounding component, the antenna bounding component being electrically and physically connected to a top cover portion of the portable information handling system; and, an antenna, the antenna being mounted to the antenna bounding portion, radio frequency (RF) radiation radiating via an RF radiation path, the RF radiation path being provided by a radiation slot, the radiation slot being located within a bottom cover portion of the portable information handling system.

In another embodiment the invention relates to an information handling system comprising: a processor; a data bus coupled to the processor; and an information handling system chassis housing, the housing comprising a base chassis, the base chassis housing the processor, the base chassis comprising an antenna assembly, the antenna assembly comprising an antenna bounding component, the antenna bounding component being electrically and physically connected to a top cover portion of the portable information handling system; and, an antenna, the antenna being mounted to the antenna bounding portion, radio frequency (RF) radiation radiating via an RF radiation path, the RF radiation path being provided by a radiation slot, the radiation slot being located within a bottom cover portion of the portable information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Various aspects of the present disclosure include an appreciation that known antenna systems do not provide a downward facing radio frequency (RF) slot as well as an RF transparent window through a top cover portion of a base chassis of a portable information handling system. For the purposes of this disclosure radio frequency shall refer to a frequency or band of frequencies suitable for use in any type of wireless communication.

A system is disclosed for integrating an antenna within a portable information handling system. In various embodiments, the system provides a multi-part antenna solution. In various embodiments, the antenna is assembled to the C-Cover while the antenna is slotted through the D-Cover. In various embodiments, the system includes a topside opening between a base chassis and a display chassis. In various embodiments, the topside opening is tiered to provide strength to the sidewall of the base chassis while directing RF patterns around the edge of the display chassis when the information handling system is in a closed configuration. In various embodiments, the antenna is fastened to a grounding plane of the top cover portion of the base chassis. In various embodiments, the grounding plane is provided via a magnesium aluminum plate. In various embodiments, the system provides a gap between the metal of the bottom cover portion of the base chassis and the grounding plane of the top cover portion.

Figure 1:
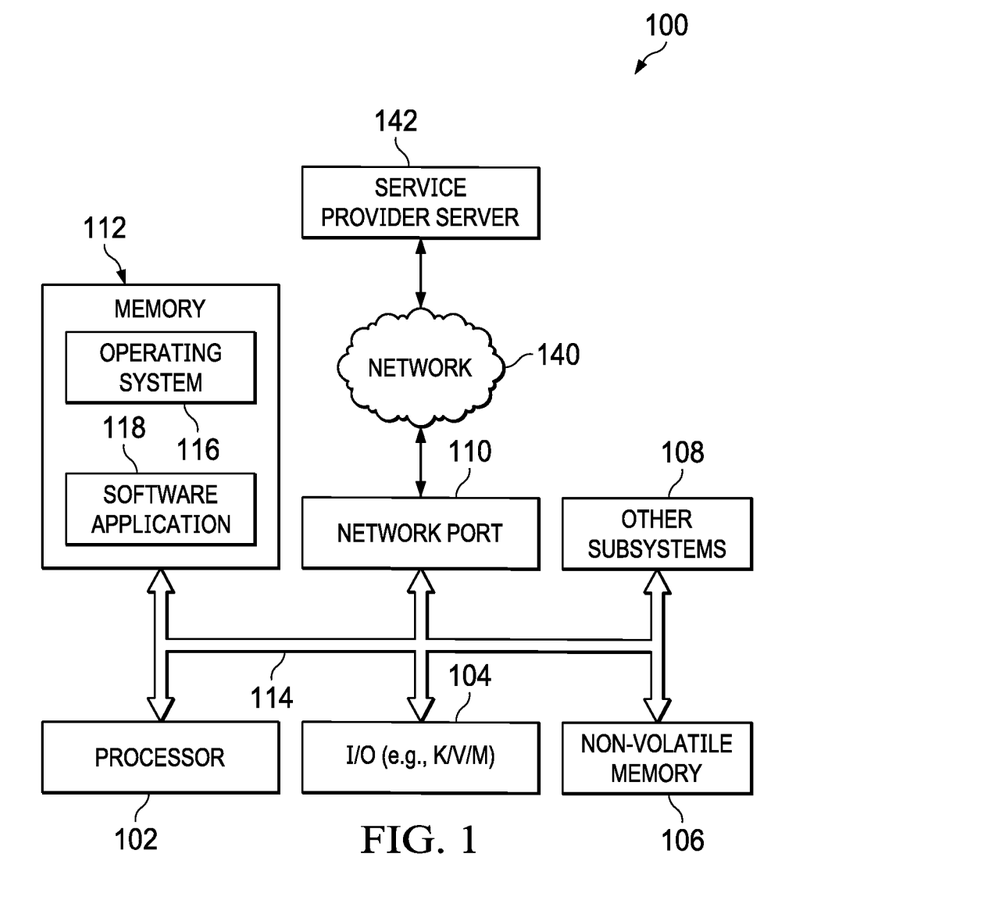
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
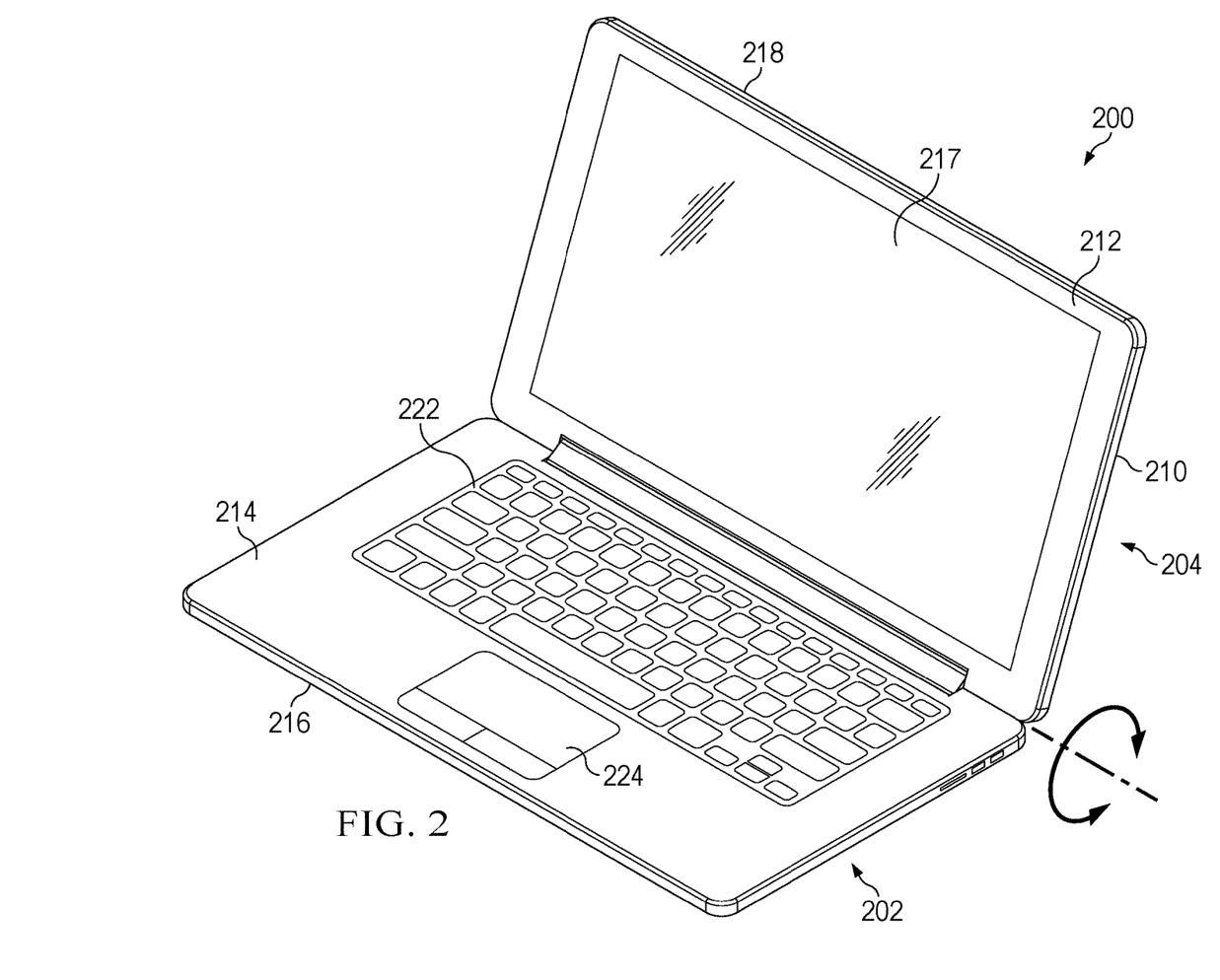
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 217 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 202 and the D-cover 204 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 212.

In various embodiments, the A-cover 210 may be movably connected to a back edge of the D-cover 216 via one or more hinges. In this configuration, the hinges allow the A-cover 210 to rotate from and to the D-cover 216 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 210 with regard to the D-cover 216, for example up to 180° rotation arc. In other embodiments the information handling system 200 may be a convertible information handling system with full rotation to a tablet configuration.

Figure 3:
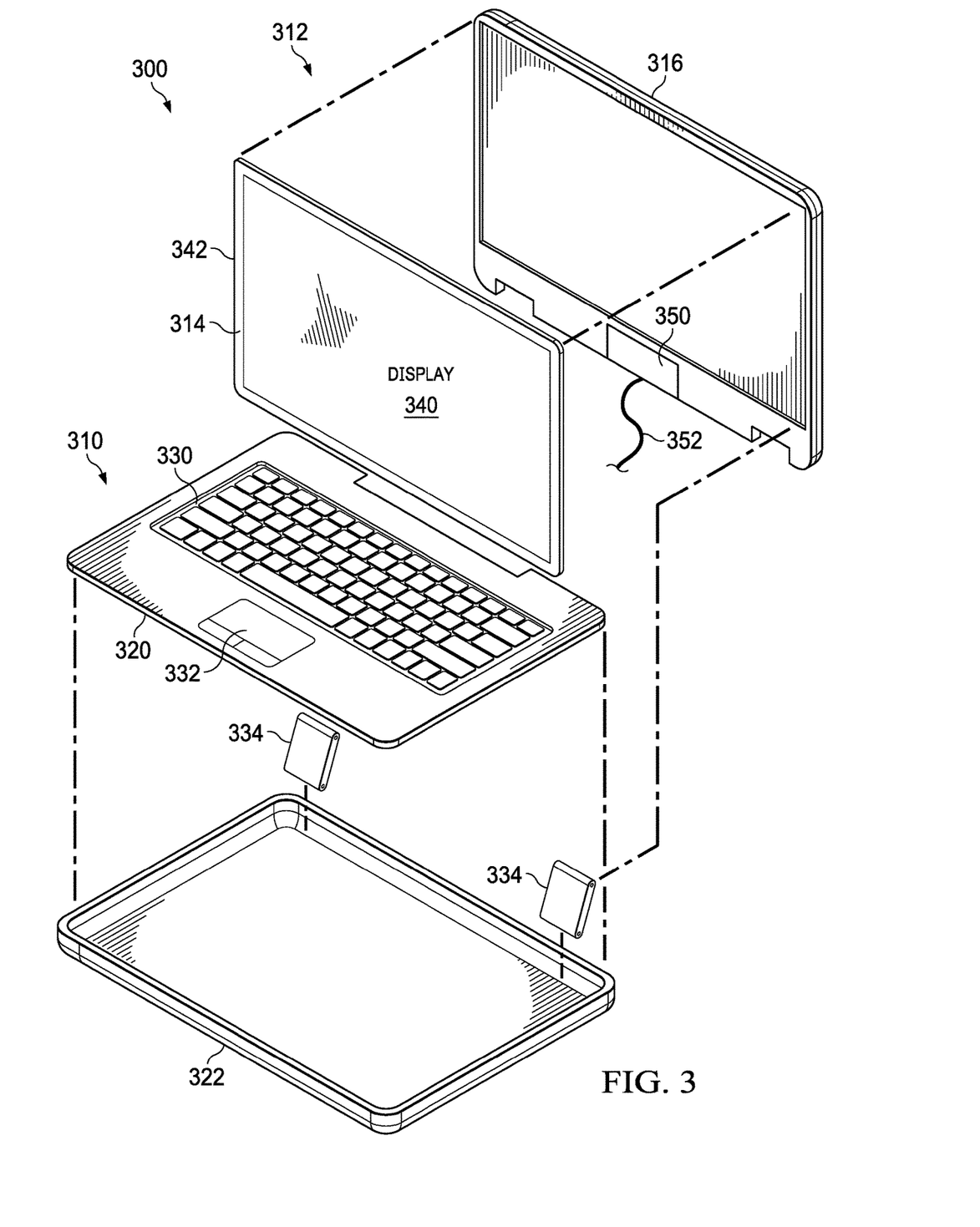
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 334 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
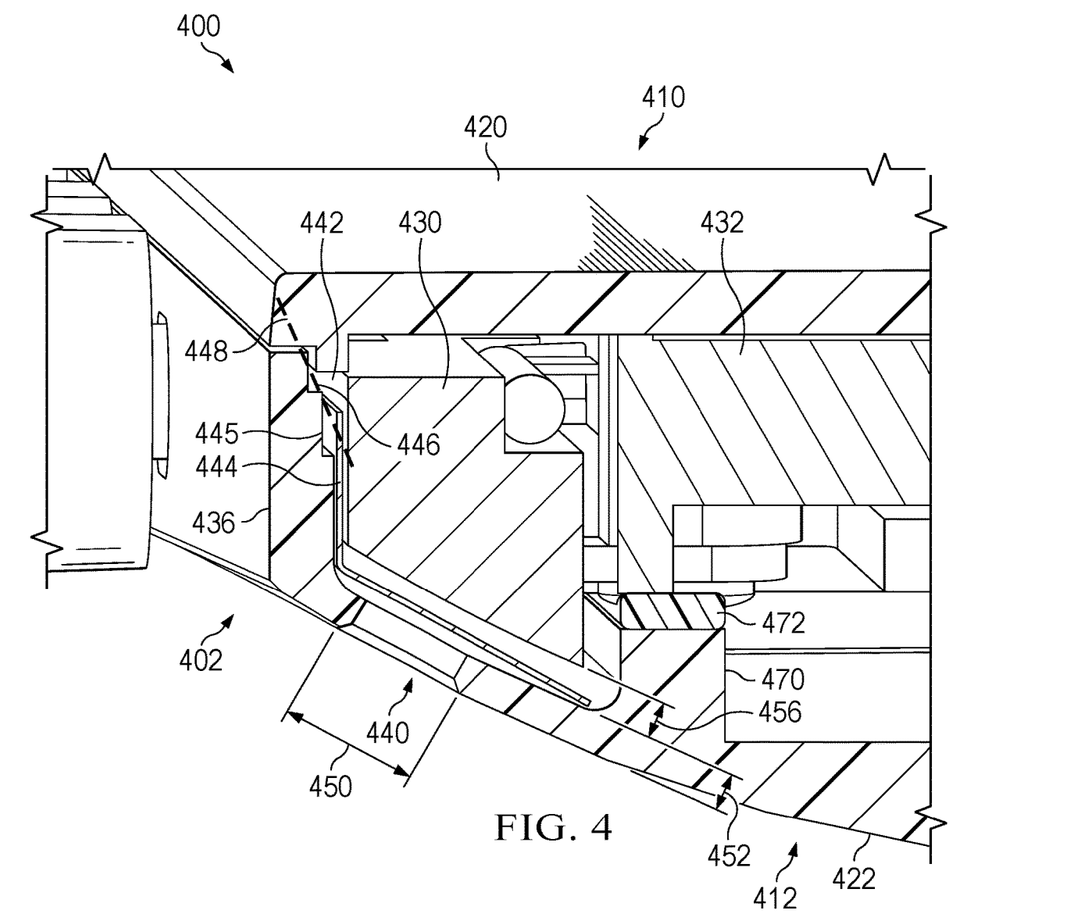
FIG. 4 shows a cross sectional view of a portion of a portable information handling system including an antenna

FIG. 4 shows a cross sectional view of a portion of a portable information handling system 400. In certain embodiments, the cross sectional view corresponds to a side portion of a portable information handling system. The portable information handling system 400 includes a main housing portion 402. The main housing portion 402 includes a top cover portion 410 and a bottom cover portion 412. The top cover portion 410 includes a C-Cover 420. The bottom cover portion 412 includes a D-Cover 422.

The portable information handling system 400 includes an antenna 430. In certain embodiments, the antenna 430 is electrically and physical coupled to the top cover portion 410 of the portable information handling system 400. In certain embodiments, the antenna is physically connected to the C-Cover 420. In certain embodiments, the antenna is indirectly connected to the C-Cover 420 (i.e., via other components that are directly or indirectly connected to the C-Cover).

In certain embodiments, the antenna 430 is coupled to a bounding component 432. In certain embodiments, the bounding component is physically coupled to the top cover portion 410 of the portable information handling system 400. In certain embodiments, the bounding component 432 is physically and electrically coupled to a ground plane. In certain embodiments, the bottom cover portion 412 includes a cosmetic component 436. In certain embodiments, the cosmetic component 436 obscures visibility of the antenna 430 through a slot of the D-Cover. In certain embodiments, the cosmetic component 436 is RF transparent.

In various embodiments, the antenna system provides a multi-part antenna solution. In various embodiments, the antenna system includes the antenna 430 assembled to the C-Cover 420 in combination with the slot 440 defined by the D-Cover 422. In various embodiments, the antenna system includes a topside opening 442 that provides an RF path between the base housing portion 402 and a lid housing portion (i.e., a display chassis). In various embodiments, the topside opening 442 is tiered to provide strength to the sidewall of the base chassis while directing RF patterns around the edge of the display chassis when the information handling system is in a closed configuration. In various embodiments, the topside opening 442 includes three tiers 444, 445, 446. In various embodiments, the tiers provide a slanted RF path 448. It will be appreciated that the slanted RF path 448 could be provided in other configurations. For example, a slanted wall could provide the slanted RF path 448. Also, for example fewer or more tiers could be used to provide the slanted RF path 448.

In various embodiments, the antenna is fastened to a grounding plane of the top cover portion of the base chassis. In various embodiments, the grounding plane is provided via a magnesium aluminum plate. In various embodiments, the system provides a gap between the metal of the bottom cover portion of the base chassis and the grounding plane of the top cover portion.

In certain embodiments, a plurality of dimensions contributed to the function of the antenna 430 for the portable information handling system 400. In certain embodiments, the plurality of dimensions includes a slot width dimension 450. In certain embodiments, the plurality of dimensions includes a slot length dimension (not shown in FIG. 4). In certain embodiments, the plurality of dimensions includes a D-Cover at slot dimension 452. It will be appreciated that the D-Cover at slot dimension 442 corresponds to a slot depth dimension. In certain embodiments, the plurality of dimensions includes a depth from antenna to inside edge of D-Cover dimension 456. In certain embodiments, the slot length dimension tunes the frequency for 2.4 gHz. The slot width dimension is generally for bandwidth at 2.4 ghz. The gap from the antenna to D-cover (i.e., the depth from antenna to inside edge of D-Cover dimension 456) is for coupling and exciting the 2.4 ghz slot. If the gap is too big, then there isn't enough capacitance to excite the slot. The AL thickness near the slot needs to be uniform so that the coupling is uniform. The side wall thickness of the bottom cover portion is reduced to 0.7 mm (e.g., by providing the bottom cover portion with the slanted RF path 448) to improve closed mode efficiency of the antenna. In certain embodiments, the slot width dimension 450 is 2.5 mm (+/−10%). In certain embodiments the D-Cover at slot dimension 452 is 0.7 mm (+/−10%). In certain embodiments, the depth from antenna to inside edge of D-Cover dimension 456 is 1.0 mm (+/−10%).

In certain embodiments, the D-Cover includes a bounding wall portion 470. In certain embodiments, an edge of the bounding wall portion 470 is contiguous with the bounding component 432. In certain embodiments, the bounding wall portion 470 is coupled to the bounding component 432 via a gasket 472. In certain embodiments, the gasket has 50% compression.

Figure 5:
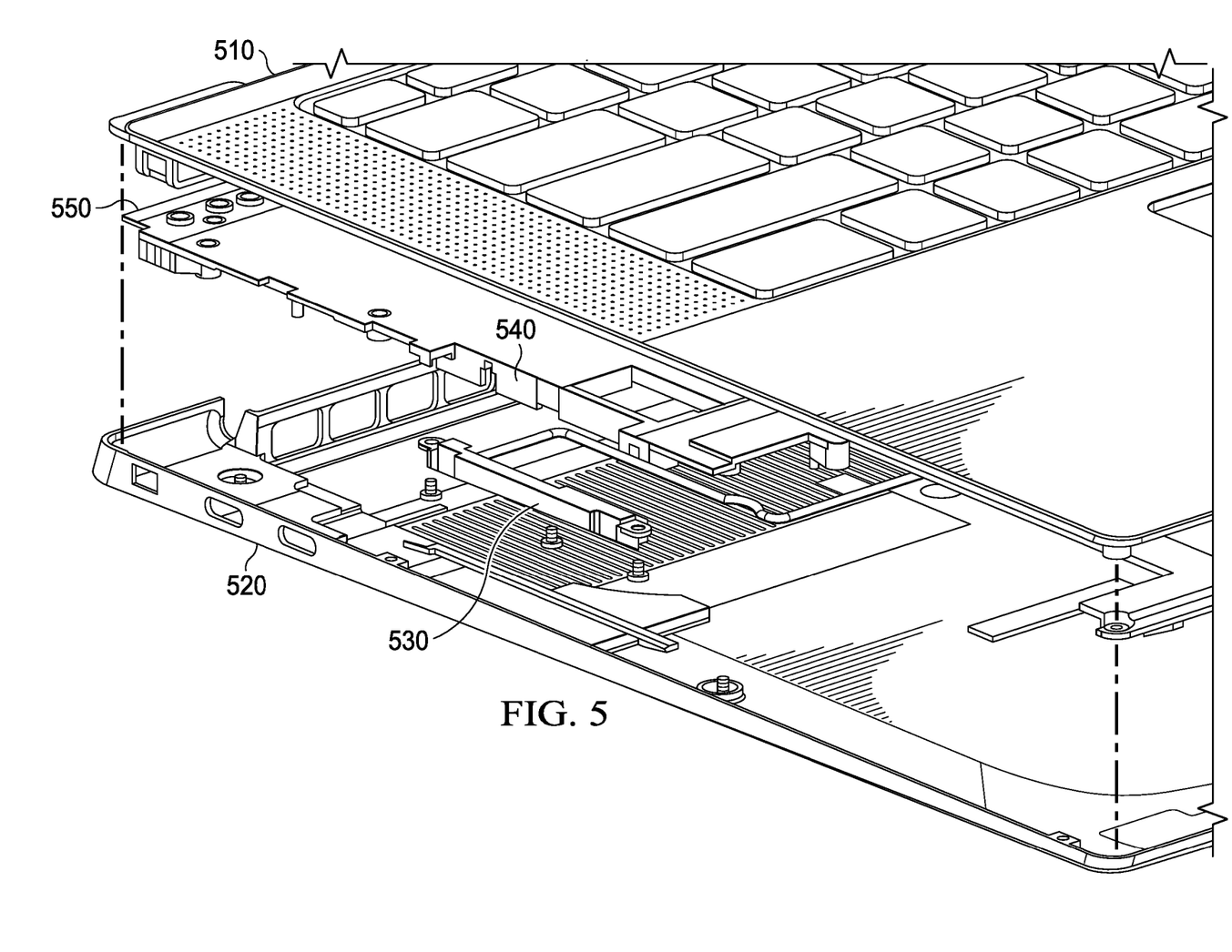
FIG. 5 shows an exploded perspective of a portion of a portable information handling system including an antenna.

FIG. 5 shows an exploded perspective of a portion of a portable information handling system 500. The portable information handling system includes a top cover portion 510, a bottom cover portion 520 and an antenna 530. In certain embodiments, the antenna 530 is electrically and physical coupled to the top cover portion 510 of the portable information handling system 500. In certain embodiments, the top cover portion 510 corresponds to top cover portion 410, the bottom cover portion 520 corresponds to bottom cover portion 412 and the antenna 530 corresponds to antenna 430.

In certain embodiments, the antenna 530 is physically connected to the C-Cover. In certain embodiments, the antenna 530 is indirectly connected to the C-Cover (i.e., via other components that are directly or indirectly connected to the C-Cover).

In certain embodiments, the antenna 530 is coupled to a bounding component 540. In certain embodiments, the bounding component 540 corresponds to bounding component 432. In certain embodiments, the bounding component 540 is physically coupled to the top cover portion 510 of the portable information handling system 500. In certain embodiments, the bounding component 540 is physically and electrically coupled to a ground plane 550, which is in turn coupled to the C-Cover of the top cover portion 510.

Figure 6:
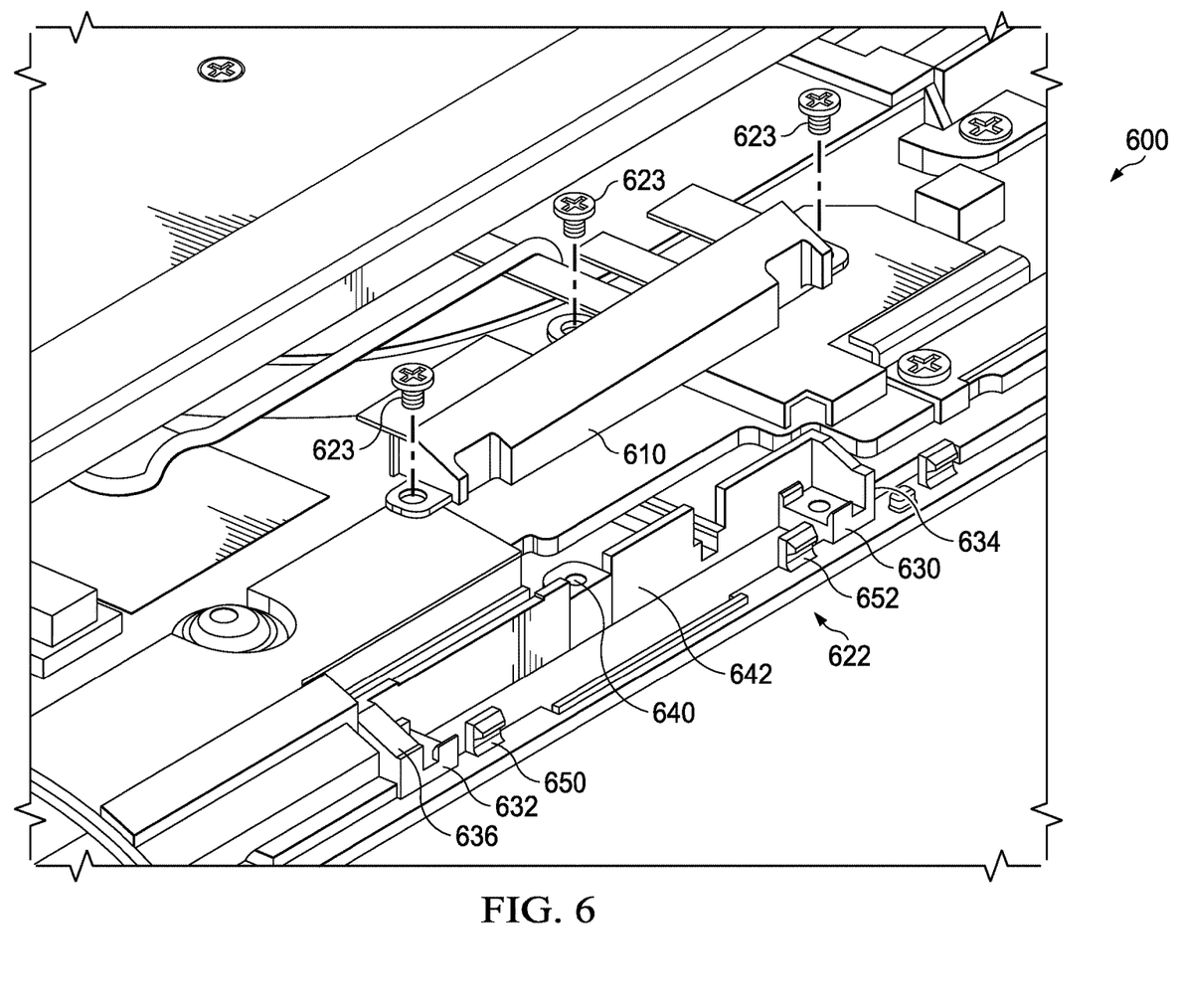
FIG. 6 shows an exploded perspective view of a top cover portion of a portable information handling system.
Figure 7:
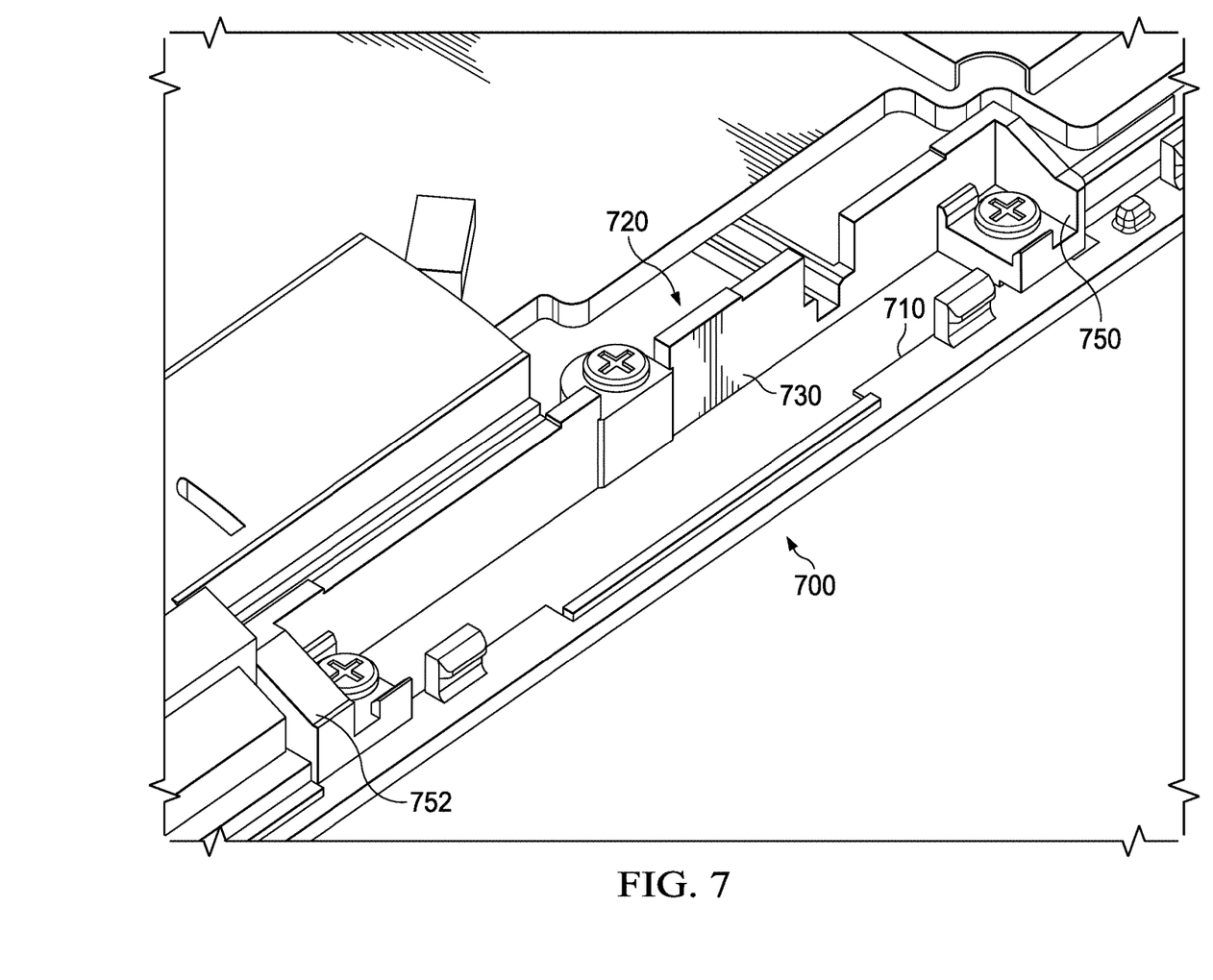
FIG. 7 shows a perspective view of a portion of a top cover portion including an antenna mounting portion.
Figure 8:
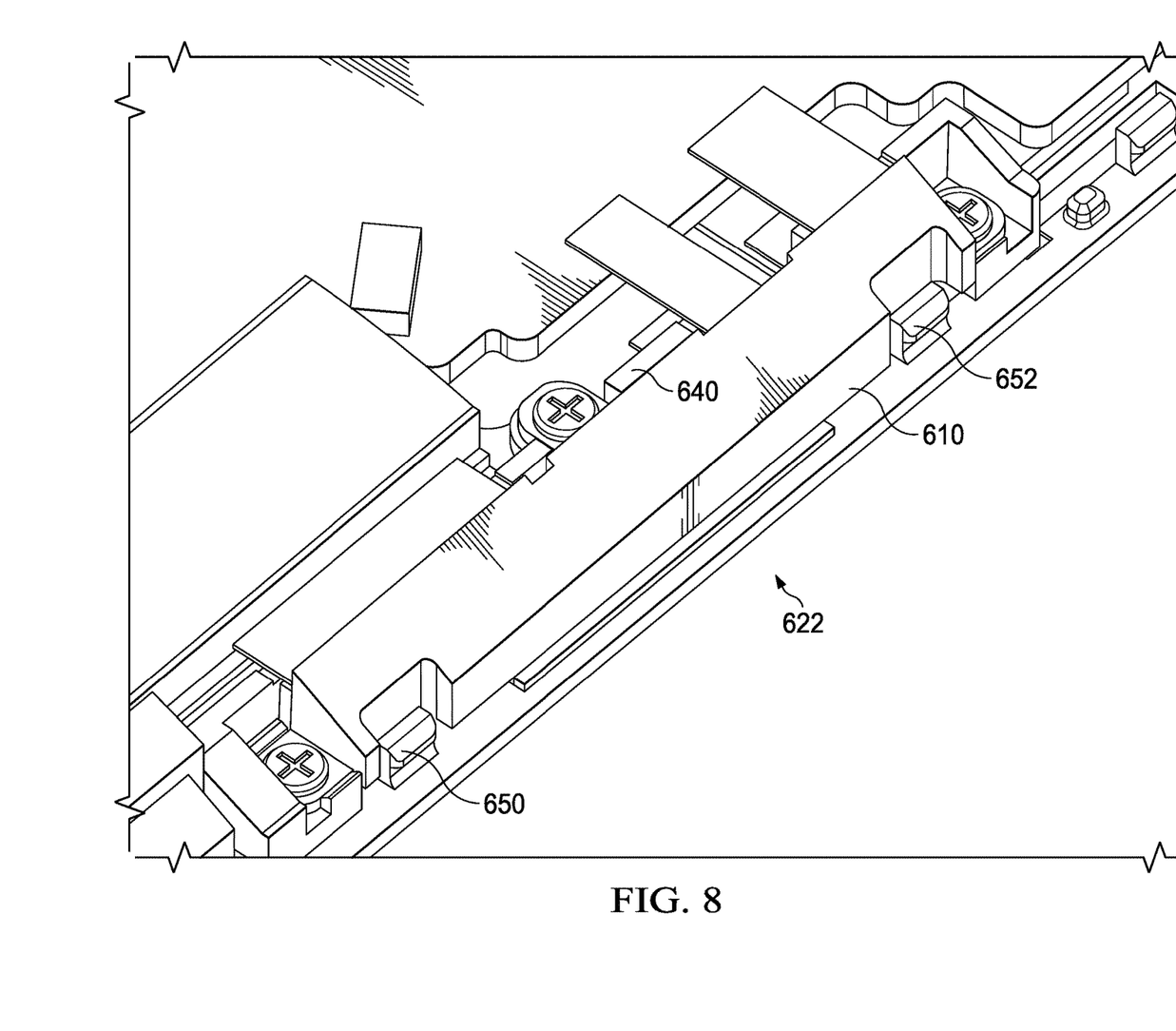
FIG. 8 shows a perspective view of a top cover portion of a portable information handling system including an antenna mounted within an antenna counting portion.

FIG. 6 shows an exploded perspective view of a portion of a top cover portion 600 of a portable information handling system 600. FIG. 7 shows a perspective view of a portion of a top cover portion 600 including an antenna mounting portion 700. FIG. 8 shows a perspective view of a top cover portion 600 of a portable information handling system including an antenna mounted within the antenna mounting portion 700. The top cover portion 600 includes an antenna 610. In certain embodiments, the antenna 610 corresponds to antenna 430. The top cover portion 600 further includes a bounding component 620. In certain embodiments, the bounding component 620 corresponds to bounding component 432.

In certain embodiments, the antenna 610 is physically and electrically connected to the bounding component 620. The antenna 610 and bounding component 620 provide an antenna assembly 622. In certain embodiments, the antenna 610 is coupled to the bounding component 620 at a plurality of locations. In certain embodiments, the antenna is coupled to the bounding component 620 via one or more connection devices 623 (e.g., screws). In certain embodiments, the bounding component 620 is connected to a ground plane of the top cover portion 600. In certain embodiments an additional conductor (e.g., copper tape) may be used when coupling the antenna to the bounding component and the bounding component to a ground plane.

In certain embodiments, the plurality of locations includes an edge location 630 and an edge location 632. In certain embodiments, the edge location 630 and the edge location 632 extend inwardly (i.e., into a bounding area of the bounding component 620) from respective walls 634, 636 of the bounding component 620. In certain embodiments, the plurality of locations includes a central location 640. In certain embodiments, the central location 640 is positioned on a wall 642 of the bounding component 620. In certain embodiments, the central location 640 is positioned in a location which extends outwardly (i.e., away from a bounding area of the bounding component 620).

In certain embodiments, the top cover portion 600 includes a plurality of connection tabs 650, 652. In certain embodiments, the plurality of connection tabs are used to connect the top cover portion 600 with a bottom cover portion of a main housing portion of a portable information handling system. In certain embodiments, the antenna 610 is positioned within a bounding area defined by the walls 634, 636 and 640 as well as connection tabs 650, 652 (see e.g., FIG. 8).

Figure 9:
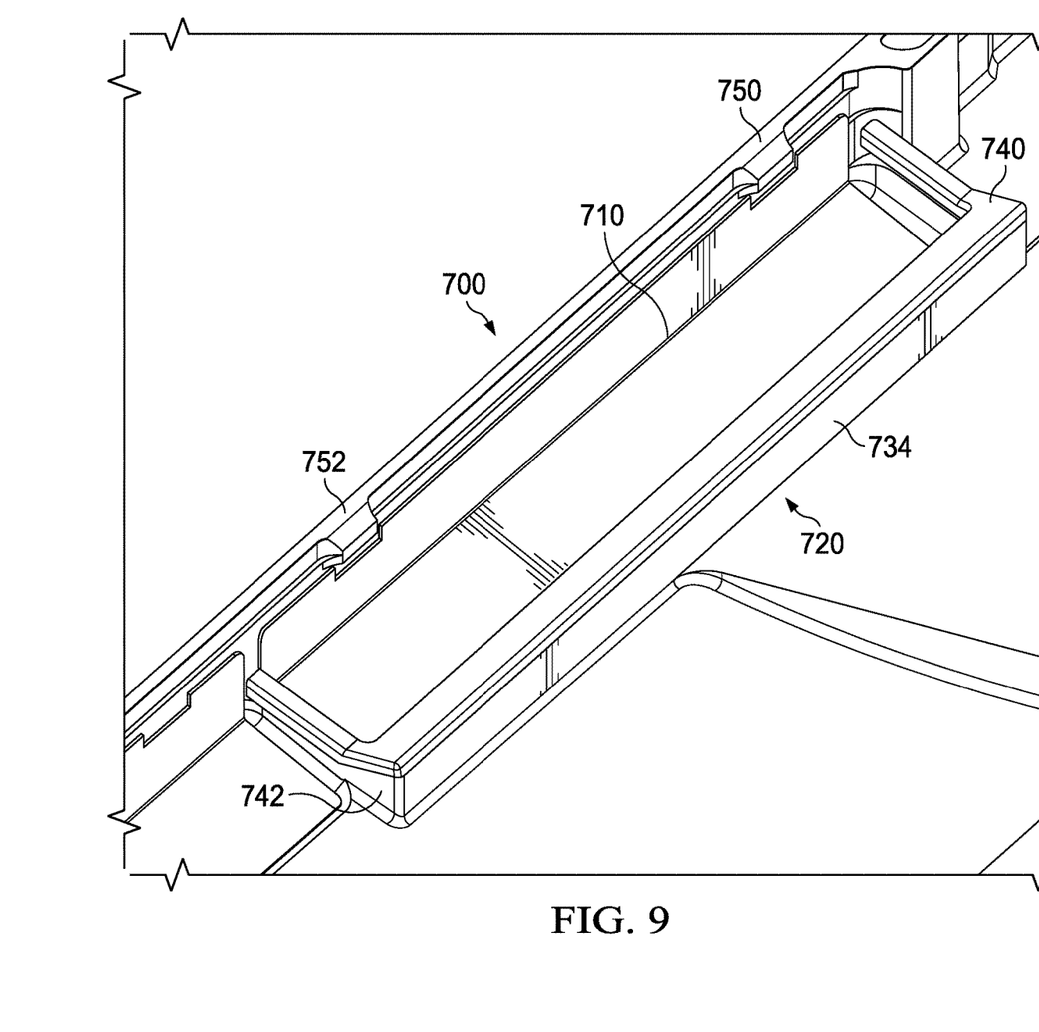
FIG. 9 shows a perspective view of an antenna slot portion of a portable information handling system.

FIG. 9 shows a perspective view of an antenna slot portion 700 of a bottom cover portion of a portable information handling system. In certain embodiments, the antenna slot portion 700 includes an antenna slot 710 defined by the bottom cover portion of the base chassis. In certain embodiments, the antenna slot 710 is defined by the D-Cover of the bottom cover portion of the base chassis.

In certain embodiments, the antenna slot portion 700 further includes a bounding component 720. In certain embodiments, the bounding component 720 includes a center bounding wall portion 730. In certain embodiments, the center bounding wall portion 730 corresponds to the bounding wall portion 470. In certain embodiments, the bounding component 720 includes a side bounding wall portion 750. In certain embodiments, the bounding component 720 includes a side bounding wall portion 752. In certain embodiments, one or more of the center bounding wall portion 730, the side bounding wall portion 750 and the side bounding wall portion 752 are integrally formed as part of the D-Cover. For the purposes of this disclosure, integrally formed shall mean formed from the same piece of material.

In certain embodiments, an edge of the center bounding wall portion 730 is contiguous with the wall 642 of the bounding component 620. In certain embodiments, an edge of the side bounding wall portion 740 is contiguous with the wall 634 of the bounding component 620. In certain embodiments, an edge of the side bounding wall portion 742 is contiguous with the wall 636 of the bounding component 620.

When the top cover portion 600 and the bottom cover portion 700 are assembled, the antenna assembly 622 and the antenna slot portion 700 provide a completed antenna assembly. In certain embodiments, the completed antenna assembly provides a six sided RF isolated cavity (which may also be referred to as an RF bounding box).

Figure 10:
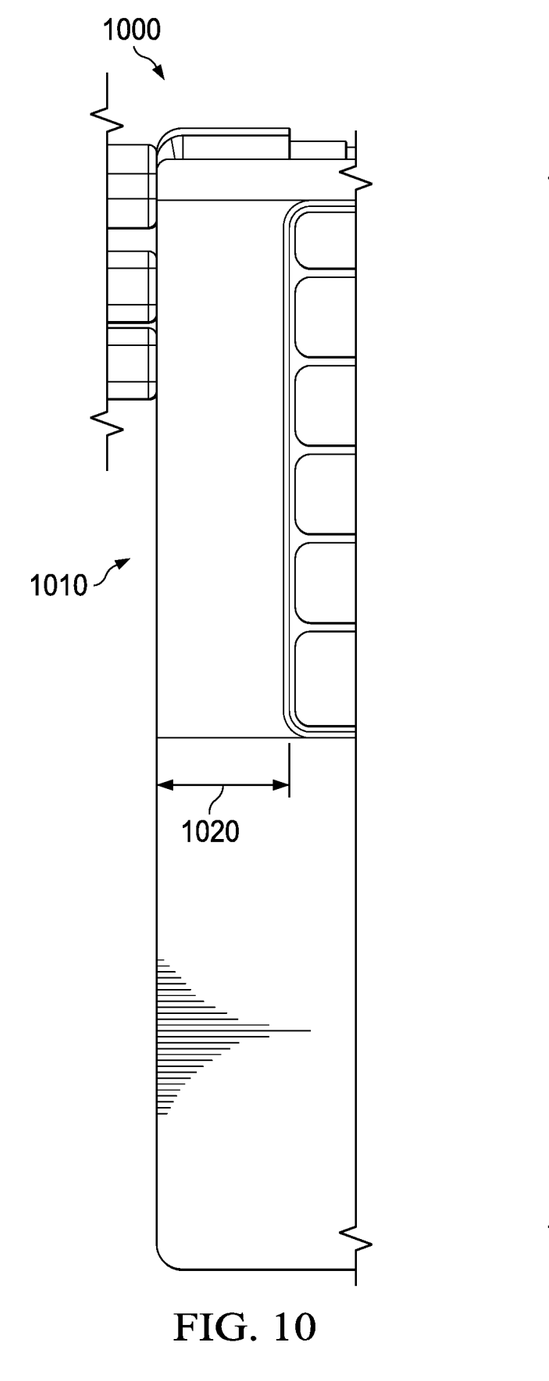
FIG. 10 shows a top view of a portion of a side portion of a portable information handling system.

FIG. 10 shows a top view of a side portion 1000 of a portable information handling system. More specifically, an antenna is located under a portion 1010 of the C-Cover between an edge of the keyboard and the outside edge of the portable information handling system. This portion 1010 has a corresponding width 1020 which is defined by the edge of the keyboard and the outside edge of the portable information handling system. This portion 1010 is RF transparent to provide a secondary RF transmission path for the antenna.

In certain embodiments, the other side of the portable information handling system includes another antenna located under the portion of the C-cover between the other edge of the keyboard and the other outside edge of the portable information handling system.

Figure 11:
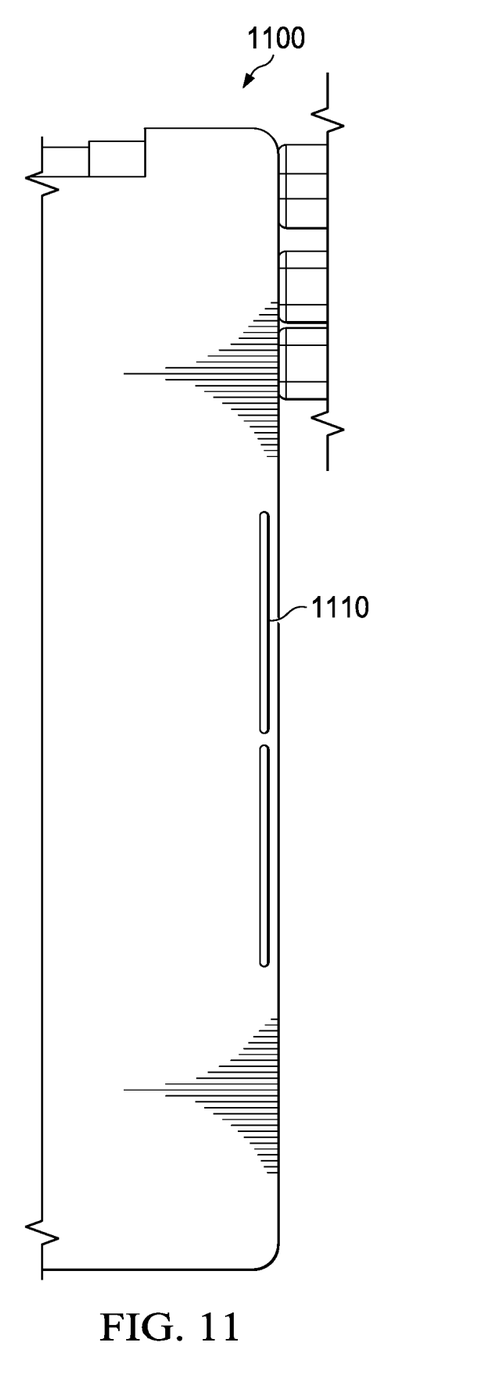
FIG. 11 shows a bottom view of a portion of a side portion of a portable information handling system.

FIG. 11 shows a bottom view of a side portion 1100 of a portable information handling system. More specifically, a downwardly facing slot 1110 is located along an outside edge of the D-Cover of the portable information handling system. This slot 1110 provides an RF transmission path through a D-Cover which is not RF transparent (such as when the D-Cover is fabricated from metal).

Figure 12:
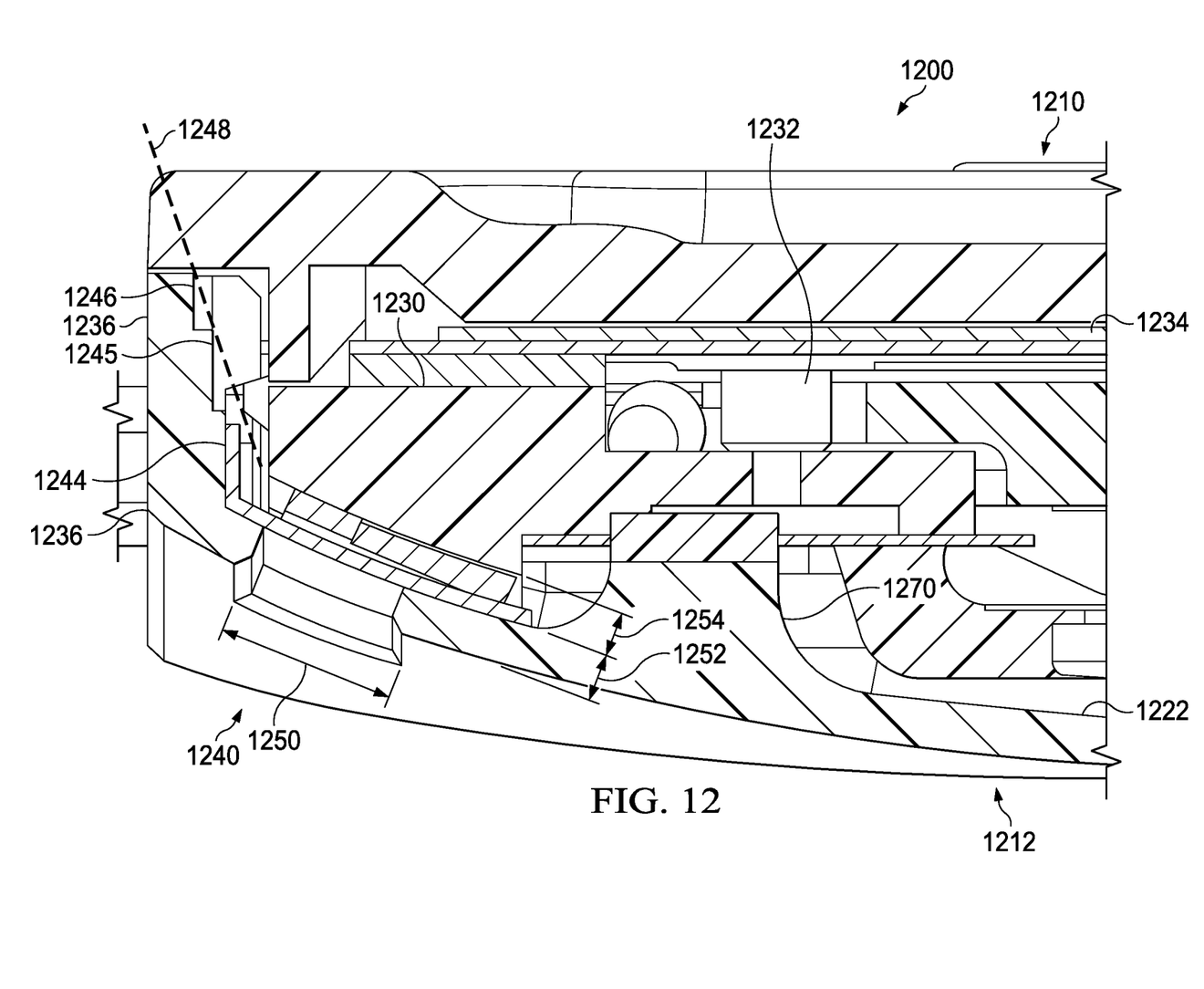
FIG. 12 shows a cross sectional view of a portion of a portable information handling system including an antenna

FIG. 12 shows a cross sectional view of a portion of a portable information handling system 1200. In certain embodiments, the cross sectional view corresponds to a side portion of a portable information handling system. The portable information handling system 1200 includes a main housing portion 1202. The main housing portion 1202 includes a top cover portion 1210 and a bottom cover portion 1212. The top cover portion 1210 includes a C-Cover 1220. The bottom cover portion 1212 includes a D-Cover 1222.

The portable information handling system 1200 includes an antenna 1230. In certain embodiments, the antenna 1230 is electrically and physical coupled to the top cover portion 1210 of the portable information handling system 1200. In certain embodiments, the antenna is physically connected to the C-Cover 1220. In certain embodiments, the antenna is indirectly connected to the C-Cover 1220 (i.e., via other components that are directly or indirectly connected to the C-Cover).

In certain embodiments, the antenna 1230 is coupled to a bounding component 1232. In certain embodiments, the bounding component is physically coupled to the top cover portion 1210 of the portable information handling system 1200. In certain embodiments, the bounding component 1232 is physically and electrically coupled to a ground plane 1234. In certain embodiments, the ground plane 1234 is a ground plane of a keyboard assembly and the bounding component is coupled to the ground plane of the keyboard assembly. In certain embodiments, the bottom cover portion 1212 includes a cosmetic component 1236. In certain embodiments, the cosmetic component 1236 obscures visibility of the antenna 1230 through a slot of the D-Cover. In certain embodiments, the cosmetic component 1236 is RF transparent.

In various embodiments, the antenna system provides a multi-part antenna solution. In various embodiments, the antenna system includes the antenna 1230 assembled to the C-Cover 1220 in combination with the slot 1240 defined by the D-Cover 1222. In various embodiments, the antenna system includes a topside opening 1242 that provides an RF path between the base housing portion 1202 and a lid housing portion (i.e., a display chassis). In various embodiments, the topside opening 1242 is tiered to provide strength to the sidewall of the base chassis while directing RF patterns around the edge of the display chassis when the information handling system is in a closed configuration. In various embodiments, the topside opening 1242 includes three tiers 1244, 1245, 1246. In various embodiments, the tiers provide a slanted RF path 1248. It will be appreciated that the slanted RF path 1248 could be provided in other configurations. For example, a slanted wall could provide the slanted RF path 1248. Also, for example fewer or more tiers could be used to provide the slanted RF path 1248.

In various embodiments, the antenna is fastened to a grounding plane of the top cover portion of the base chassis. In various embodiments, the grounding plane is provided via a magnesium aluminum plate. In various embodiments, the system provides a gap between the metal of the bottom cover portion of the base chassis and the grounding plane of the top cover portion.

In certain embodiments, a plurality of dimensions contributed to the function of the antenna 1230 for the portable information handling system 1200. In certain embodiments, the plurality of dimensions includes a slot width dimension 1250. In certain embodiments, the plurality of dimensions includes a slot length dimension (not shown in FIG. 12). In certain embodiments, the plurality of dimensions includes a D-Cover at slot dimension 1252. It will be appreciated that the D-Cover at slot dimension 1252 corresponds to a slot depth dimension. In certain embodiments, the plurality of dimensions includes a depth from antenna to inside edge of D-Cover dimension 1256.

In certain embodiments, the D-Cover includes a bounding wall portion 1270. In certain embodiments, an edge of the bounding wall portion 1270 is contiguous with the bounding component 1232.

Figure 13:
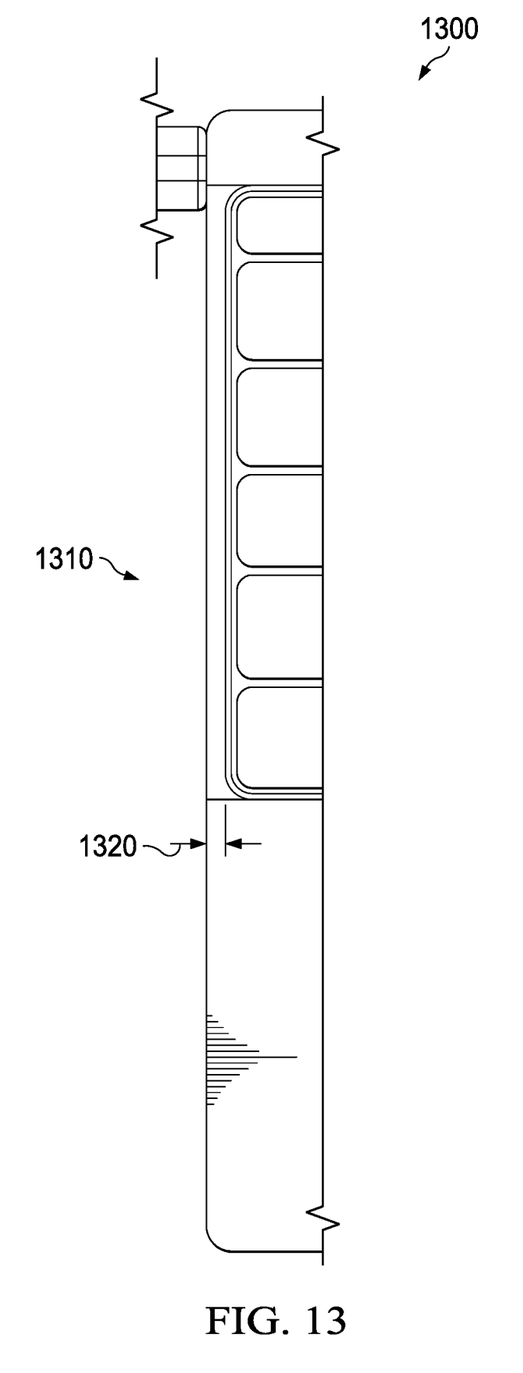
FIG. 13 shows a top view of a portion of a side portion of a portable information handling.

FIG. 13 shows a top view of a side portion 1300 of a portable information handling system. More specifically, an antenna is located under a portion 1310 of the C-Cover between an edge of the keyboard and the outside edge of the portable information handling system. This portion 1310 has a corresponding width 1320 which is defined by the edge of the keyboard and the outside edge of the portable information handling system. This portion 1310 is RF transparent to provide a secondary RF transmission path for the antenna.

In certain embodiments, the other side of the portable information handling system includes another antenna located under the portion of the C-cover between the other edge of the keyboard and the other outside edge of the portable information handling system.

Figure 14:
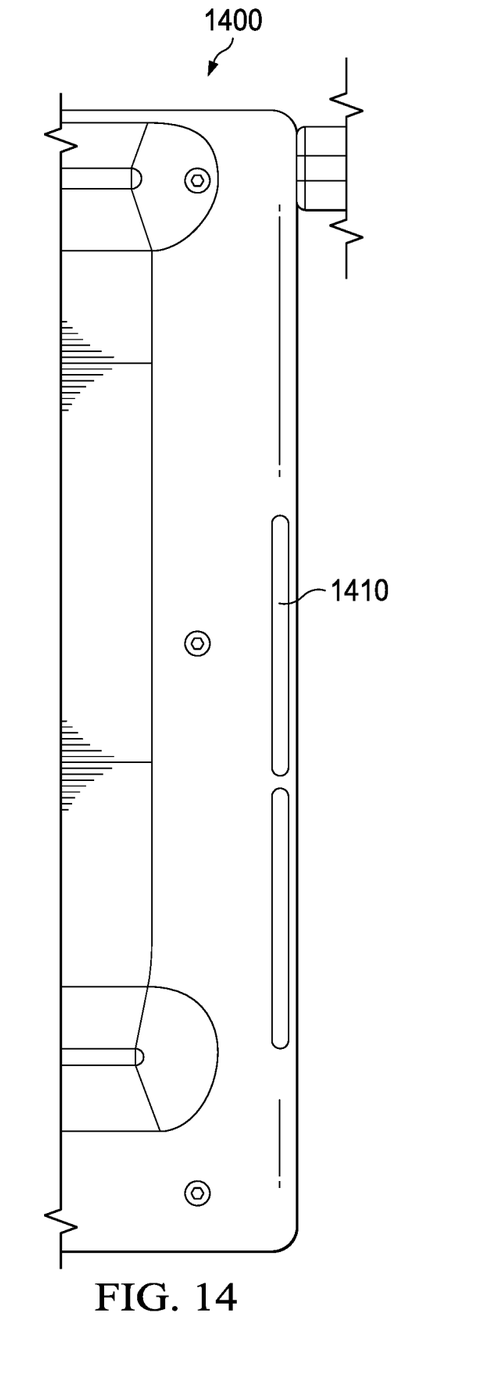
FIG. 14 shows a bottom view of a portion of a side portion of a portable information handling.

FIG. 14 shows a bottom view of a side portion 1400 of a portable information handling system. More specifically, a downwardly facing slot 1410 is located along an outside edge of the D-Cover of the portable information handling system. This slot 1410 provides an RF transmission path through a D-Cover which is not RF transparent (such as when the D-Cover is fabricated from metal).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. An antenna assembly for a portable information handling system, comprising:
   an antenna bounding component, the antenna bounding component being electrically and physically connected to a top cover portion of a base chassis of the portable information handling system;
   an antenna, the antenna being mounted to the antenna bounding component, radio frequency (RF) radiation radiating via an RF radiation path, the RF radiation path being provided by a radiation slot, the radiation slot being located within a bottom cover portion of the base chassis of the portable information handling system, the antenna is located between an edge of a keyboard and an outside edge of the portable information handling system, the radiation slot extending along an outside edge of the portable information handling system; and, the top cover portion includes a topside RF opening, the topside RF opening providing a secondary RF radiation path, the secondary RF radiation path being located between the edge of the keyboard and the outside edge of the portable information handling system; and wherein the bottom cover portion of the base chassis is constructed of metal;

the radiation slot provides a radiation path through the metal of the bottom cover portion of the base chassis; and, the topside RF opening is defined by an inside wall of the bottom cover portion, the inside wall of the bottom cover portion comprising a plurality of wall tiers, the plurality of wall tiers providing a slanted RF path for the secondary RF radiation path.

2. The antenna assembly of claim 1, wherein:
the antenna bounding component is coupled to a ground plane of the top cover portion of the portable information handling system.

3. The antenna assembly of claim 2, wherein:
the ground plane comprises a keyboard assembly ground plane.

4. The antenna assembly of claim 1, wherein:
the antenna assembly defines a plurality of dimensions, the plurality of dimensions comprising a slot width dimension, a slot length dimension and a slot depth dimension, the plurality of dimensions tuning a frequency of the antenna assembly.

5. An information handling system comprising:
a processor;
a data bus coupled to the processor; and
an information handling system chassis housing, the housing comprising
a base chassis, the base chassis housing the processor, the base chassis comprising a bottom cover portion, a top cover portion and an antenna assembly, the antenna assembly comprising an antenna bounding component, the antenna bounding component being electrically and physically connected to the top cover portion of the portable information handling system; and, an antenna, the antenna being mounted to the antenna bounding component, radio frequency (RF) radiation radiating via an RF radiation path, the RF radiation path being provided by a radiation slot, the radiation slot being located within the bottom cover portion of the portable information handling system, the antenna is located between an edge of a keyboard and an outside edge of the portable information handling system, the radiation slot extending along an outside edge of the portable information handling system; and, the top cover portion includes a topside RF opening, the topside RF opening providing a secondary RF radiation path, the secondary RF radiation path being located between the edge of the keyboard and the outside edge of the portable information handling system; and wherein the bottom cover portion of the base chassis is constructed of metal;

the radiation slot provides a radiation path through the metal of the bottom cover portion of the base chassis; and, the topside RF opening is defined by an inside wall of the bottom cover portion, the inside wall of the bottom cover portion comprising a plurality of wall tiers, the plurality of wall tiers providing a slanted RF path for the secondary RF radiation path.

6. The information handling system of claim 5, wherein:
the antenna bounding component is coupled to a ground plane of the top cover portion of the portable information handling system.

7. The information handling system of claim 6, wherein:
the ground plane comprises a keyboard assembly ground plane.

8. The information handling system of claim 5, wherein:
the antenna assembly defines a plurality of dimensions, the plurality of dimensions comprising a slot width dimension, a slot length dimension and a slot depth dimension, the plurality of dimensions tuning a frequency of the antenna assembly.

* * * * *